June 12, 1956
H. E. MORTON
2,749,813
FLASH TRIMMING MACHINE
Filed March 30, 1953
3 Sheets-Sheet 1
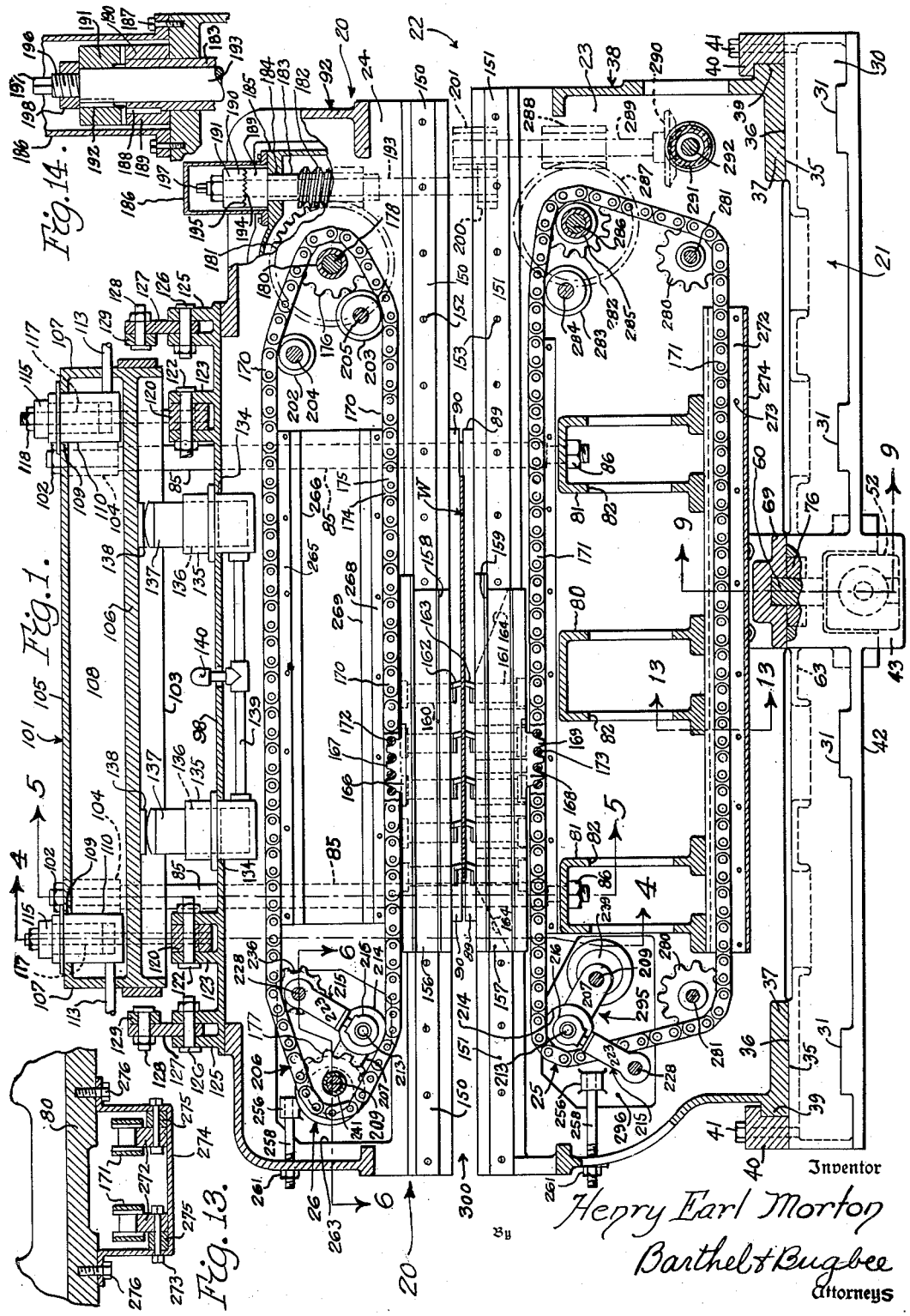
Inventor
Henry Earl Morton
By Barthel & Bugbee
Attorneys

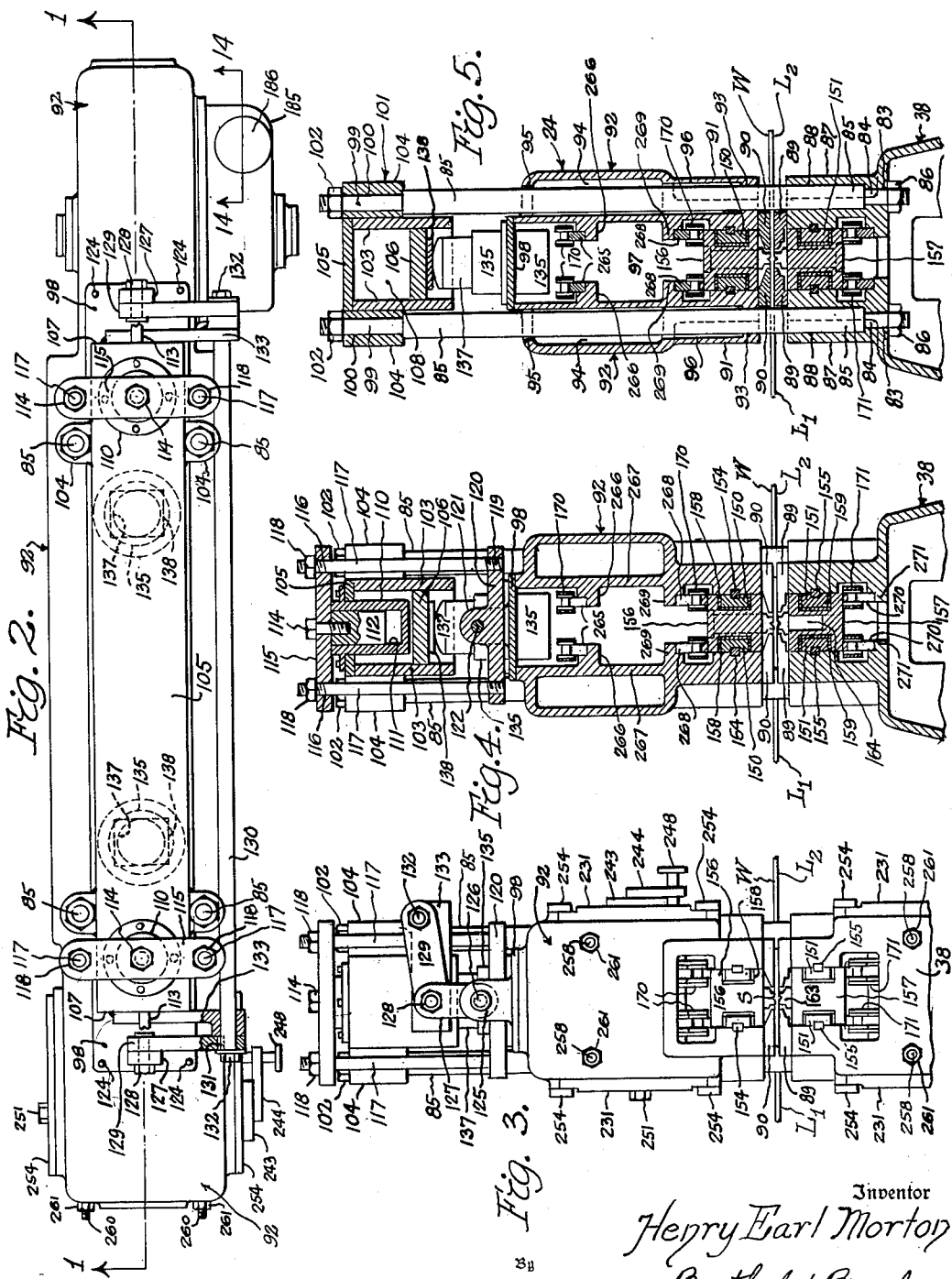

June 12, 1956 H. E. MORTON 2,749,813
FLASH TRIMMING MACHINE
Filed March 30, 1953 3 Sheets-Sheet 3
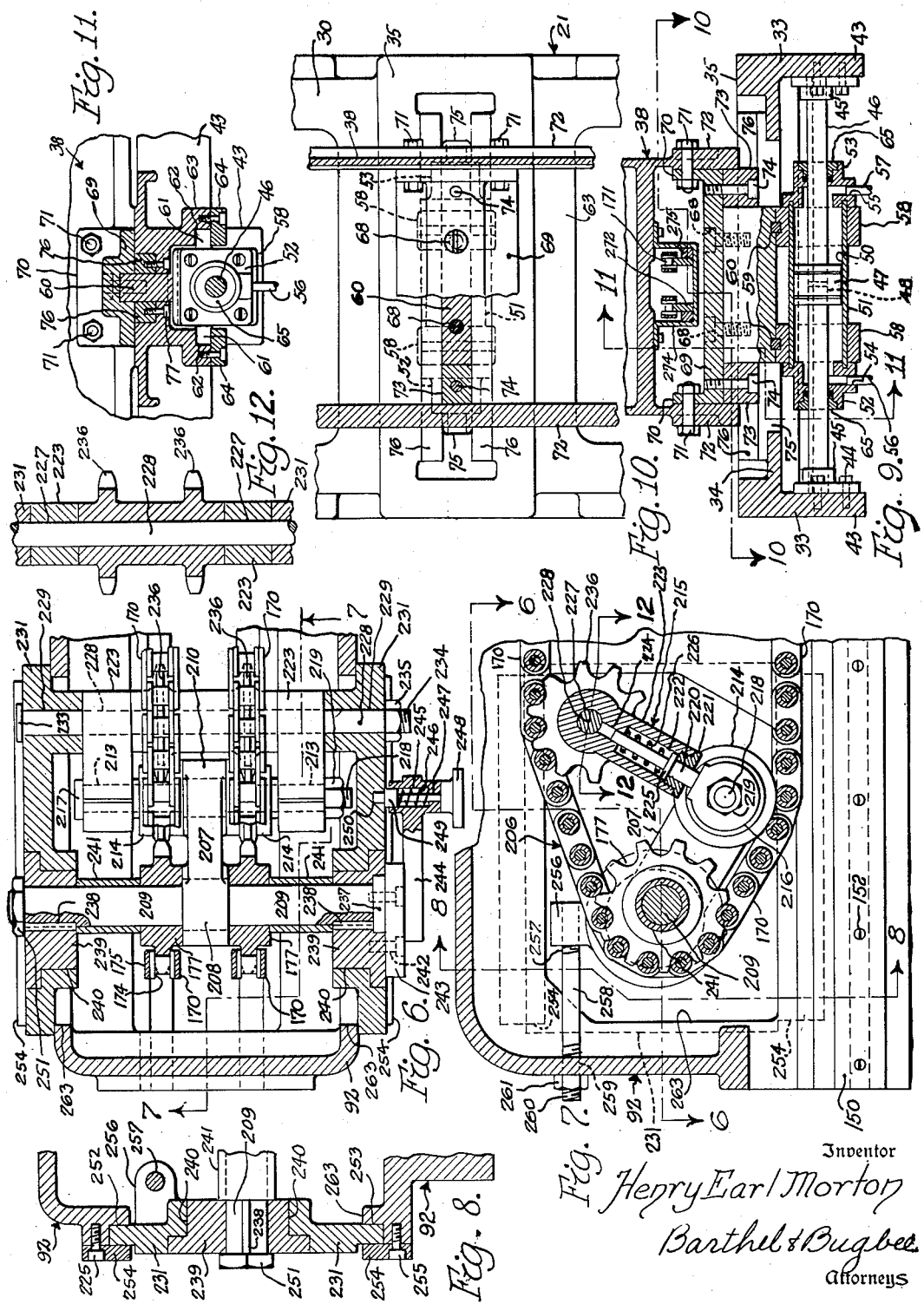
Inventor
Henry Earl Morton
Barthel & Bugbee
Attorneys

United States Patent Office 2,749,813
Patented June 12, 1956

2,749,813
FLASH TRIMMING MACHINE

Henry Earl Morton, Muskegon Heights, Mich.

Application March 30, 1953, Serial No. 345,369

3 Claims. (Cl. 90—38)

This invention relates to flash removing machines, and in particular, to flash removing machines for trimming off the flash or excess welding metal at the joint between metal sheets or strips which are welded end to end to form elongated strips.

One object of this invention is to provide a flash trimming machine wherein the clamping pressure for holding the work stationary is exerted by hydraulic pistons while the rams and their cutters move to and fro across the junction of the welded pieces and trim off the flash, thereby simplifying the machine as compared with prior machines operated by other types of mechanisms as well as increasing the clamping pressure exerted upon the work.

Another object is to provide a flash trimming machine of the foregoing character wherein after trimming the ram holding the cutters is lifted clear of the work by hydraulic pistons, thereby further simplifying the machine.

Another object is to provide a flash trimming machine of the foregoing character wherein improved hydraulic means is provided for longitudinally adjusting the machine relatively to the work, so as to align the cutters accurately with the flash to be trimmed off.

Another object is to provide a flash trimming machine of the foregoing character wherein sprocket chains are used for reciprocating the cutter rams, an improved arrangement being provided for taking up slack in the sprocket chains and also for collapsing the chains so as to enable them to be moved out of engagement with the rams in order to permit easier removal of the rams for repairs.

Another object is to provide a flash trimming machine, as set forth in the object immediately preceding, wherein a yieldingly mounted arm, such as a spring arm, carries an idler sprocket which permits yielding of the sprocket to allow the cutter ram to pass over the sprocket chain in the event of interference between the sprocket chain and the chain-engaging lugs or dogs on the ram.

Another object is to provide a flash trimming machine of the type set forth in the two immediately preceding objects, wherein an idler sprocket for the ram-driving sprocket chain is supported on a V-shaped elbow device pivotally mounted on two contact points, one of which is eccentrically mounted whereby a half revolution of the eccentric widens the angle between the arms of the elbow device so as to enable the sprocket chain to be withdrawn from engagement with the ram, by rolling the chain out of the ram.

Other objects and advantages of the invention will become apparent during the course of the following description of the accompanying drawings, wherein:

Figure 1 is a central vertical section through a flash trimming machine, according to one embodiment of the invention, taken along the line 1—1 in Figure 2;

Figure 2 is a top plan view of the flash trimming machine shown in Figure 1;

Figure 3 is a left-hand end elevation of the flash trimming machine shown in Figures 1 and 2;

Figure 4 is a vertical cross-section taken along the line 4—4 in Figure 1;

Figure 5 is a vertical cross-section taken along the line 5—5 in Figure 1;

Figure 6 is a horizontal section taken along the line 6—6 in Figures 1 and 7;

Figure 7 is an enlarged fragmentary side elevation, partly in central vertical section, of the chain slack take-up shown at the left-hand side of Figure 1 and also taken along the line 7—7 in Figure 6;

Figure 8 is a vertical section taken along the line 8—8 in Figure 7;

Figure 9 is a vertical section taken along the line 9—9 in Figure 1;

Figure 10 is a horizontal section taken along the line 10—10 in Figure 9;

Figure 11 is a vertical section taken along the line 11—11 in Figure 9;

Figure 12 is a horizontal section taken along the line 12—12 in Figure 7;

Figure 13 is a vertical section taken along the line 13—13 in Figure 1; and

Figure 14 is a central vertical section through the upper right-hand corner of Figure 1, taken along the line 14—14 in Figure 2.

General description

In general, the flash trimming machine, generally designated 20, of this invention, as embodied in the form shown for purposes of illustration in the drawings, consists of a base structure, generally designated 21, upon which the clamping and cutting assembly, generally designated 22, is reciprocably mounted for longitudinal adjustment in the direction of the long axis of the work W, which is in the form of a greatly elongated strip of sheet metal formed of shorter lengths $L_1$ and $L_2$ thereof welded together end-to-end at seams S (Figure 3) from which the "flash" or excess metal at the weld is to be removed. The clamping and cutting assembly is in turn divided into a stationary unit, generally designated 23, located mainly in the lower and upper portions of the machine, and a vertically movable unit, generally designated 24, located in the upper central portion of the machine. As will be described in more detail below, the movable unit 24 is raised and lowered hydraulically relatively to the stationary unit 23 in order respectively to selectively release or clamp the work W, and each of the units 23 and 24 contains a reciprocating cutting ram mechanism, generally designated 25 and 26, for the lower and upper assemblies or units thereof. Each of the cutting ram units 25 and 26 includes a horizontally-reciprocable ram which is moved to and fro by a sprocket chain driven by sprockets from a motor in a manner described below.

Mechanism for adjusting the machine longitudinally to the work

The clamping and cutting assembly 22 is reciprocated relatively to the base structure 21 in the below-described manner in order to position the flash trimming cutters accurately relatively to the seam S in the work W. Since the work W is in the form of a greatly-elongated or continuous strip of sheet metal, it is very unwieldy and not easily moved with fine precision. Accordingly, the machine 20 of the present invention moves the cutting assembly 22 along the base structure 21 in a direction lengthwise of the work W rather than attempting to move the work precisely relatively to the machine, in order to bring the flash trimming cutters into exact alignment with the flash or excess metal located at the seam where the weld has taken place.

The base structure 21 is in the form of a hollow horizontal laterally-elongated member 30 (Figures 1, 9 and 10) having bosses 31 along the flanged opposite long edges thereof adapted to receive hold-down bolts (not shown) by which the machine 20 is anchored to the floor of the factory or other building in which it is located. The base structure 21 is also provided with opposite side walls 33 and an upper wall 34, the opposite ends of which are provided with accurately machined flat surfaces 35. Upon the latter rest the correspondingly-machined flat lower surfaces 36 of the bottom end members 37 (Figure 1) at the bottom of the lower housing 38 of the stationary unit 23. The bottom end members 37 are provided with laterally projecting guide ribs 39 which are engaged by overhanging guide bars or gibs 40 bolted as at 41 to the base structure 21.

Located midway between the opposite ends of the base structure 21 and extending downwardly below the level of the bottom surface 42 thereof (Figures 1, 9, and 11) are large rectangular bosses 43 which are parallel to and aligned with one another. Bolted as at 44 to the inner surfaces of the bosses 43 are the flanged brackets or sockets 45 (Figure 9) which are bored to receive the opposite ends of a stationary piston rod 46 having a piston head 47 mounted in the center thereof. In actuality, the piston rod 46 is in two pieces threaded into the opposite ends of the threaded bore 48 in the piston head 47. The piston head 47 slidably engages the cylinder bore 50 of a reciprocable hydraulic cylinder 51, the opposite ends of which are closed by hollow cylinder heads 52 and 53 having ports 54 and 55 communicating with the interior thereof and threaded or otherwise equipped for the reception of pipes 56 and 57. The pipes 56 and 57 lead to a conventional hydraulic circuit (not shown) by way of a four-way valve or directly to a reversible hydraulic pump, as is convenient in the particular installation. Such hydraulic circuits are well-known to hydraulic engineers, and their details form no part of the present invention.

Secured to and encircling the opposite ends of the hydraulic cylinder 51 are motion-transmitting members 58 (Figure 9) in the form of suitably-bored rectangular blocks, the upper surfaces of which are grooved to receive the lower portions of key bars 59, the upper portions of which fit into the correspondingly grooved bottom surface of a block 60. The blocks 58 have ribs 61 extending laterally from the opposite sides thereof (Figure 11), these ribs engaging guide grooves 62 in the bottom surface of a cross member 63 of the base structure 21 and integral therewith. Retaining bars 64 are bolted or otherwise secured to the underside of the cross member 63 to retain the ribs 61 in the guide grooves 62. The hollow cylinder heads 52 and 53 are grooved at their opposite ends to receive the opposite ends of the cylinders 51 and are bored for the passage of the piston rod 46 and the annular glands 65 threaded therein and likewise bored for the passage of the piston rod 46. The packing glands 65 prevent leakage around the rod 46 in the usual way (Figure 9).

The block 60 is bolted as at 68 (Figures 9 and 11) to a cross member 69 with upstanding opposite end portions 70 (Figure 10) which are bolted as at 71 to the side walls 72 of the lower housing structure 38. Retaining blocks 73 are also bolted as at 74 to the cross member 69 at opposite ends of the block 60, the blocks 73 fitting into the spaces between the opposite ends of the block 60 and the opposite inner surfaces of the side walls 72. The block 60 passes through an elongated slot 75 and at its upper portion reciprocates between spaced parallel wear bars 76 which are bolted as at 77 to the cross member 63 (Figure 11) adjacent the opposite edges of the groove 75. In this manner and by this means, the cutting assembly 22 consisting of the movable unit 24 and stationary unit 23 are moved bodily to and fro relatively to the base structure 21, as explained below in connection with the operation of the invention.

Work clamping mechanism

The work clamping mechanism, by which the elongated strip of sheet metal W is held in a stationary position while the cutters trim off the flash at the seam S between the welded ends, is shown in Figures 1, 3, 4 and 5. The lower housing structure is provided internally with a central cross member 80 and two end cross members 81 which are double-walled and of inverted U-shaped section (Figure 1) and are cast integral with the main portion of the housing 38. The single central cross member 80, in addition to stiffening the central portion of the lower housing structure 38, also serves to support the lower cutter driving chain (Figure 13) as will be subsequently described. The end cross members 81 of which there are two, are, like the central cross member 80, provided with rectangular openings 82 through the double walls thereof, and also serve to support the lower driving chain, as likewise described below. The top walls of the end cross members 81 are provided with laterally-spaced bores 83 (Figure 5) which serve to receive the reduced diameter lower ends 84 of four strain rods 85 and are retained in position by nuts 86 threaded upon the lower ends of the reduced diameter portions 84.

The lower housing 38 has parallel upstanding portions 87 at the top thereof, the portions 87 being provided with enlarged vertical bores 88 through which the main portions of the strain rods 85 pass upwardly. Mounted on and secured to the tops of the upstanding portions 87 are elongated parallel lower work clamping jaws 89 which face toward one another in parallel spaced relationship, with a slight gap between them for the flash trimming cutters operating upon the flash at the seam S. The lower surface of the work W rests upon the lower clamping jaws 89 and its upper surface is engaged by a pair of similar elongated upper clamping jaws 90 similarly arranged in spaced parallel relationship. The upper clamping jaws 90 depend from and are secured to the bottoms of parallel depending portions 91 of the upper housing 92 of the movable unit 24 of the cutting and clamping assembly 22. The depending portions 91, like the upstanding portions 87, are in the form of spaced parallel elongated blocks, and have vertical bores 93 therein for the passage of the strain rods 83. The upper end of the housing 92 is provided with two horizontally-elongated parallel chambers 94 (Figure 5) at the top of which four holes 95 are provided for the passage of the strain rods 85. The holes 95 and the extension bores 96 of the lower end bores 93 are enlarged so as to permit ample clearance for the strain rods 85 as the upper housing 92 moves up and down.

The upper housing 92 is provided with an elongated central chamber 97 for housing the upper driving chain, as described below, and this upper chamber 97 is closed at the top by an elongated cover plate 98. The strain rods 85 pass outside the cover plate 98 and have reduced diameter upper end portions 99 passing through vertical bores 100 in an elongated fabricated head 101 and held in position by nuts 102 threaded upon the threaded upper ends thereof. The head 101 is of elongated hollow box-like construction with side members 103 secured to the bosses 104 and top and bottom members 105 and 106 respectively secured to the side members 103. The members 103, 105 and 106, together with the end walls 107 (Figure 1) enclose an elongated chamber 108, and the top wall 105 thereof is provided with openings 109 near the opposite ends thereof for receiving flanged hydraulic cylinders 110 bolted to the top wall 105 (Figure 4) and containing cylinder bores 111 in which single-acting hydraulic plungers 112 reciprocate vertically and pass outward through the open upper ends of the hydraulic cylinders 110. Pressure fluid is admitted to and discharged from the lower ends of the hydraulic cylinders 110 by pipes 113 communicating therewith and connected to a conventional hydraulic circuit (not shown) of any suitable type including a hydraulic pump. Such hydraulic circuits are well-known to hydraulic engineers and form no part of the present invention.

The upper ends of the hydraulic plungers 112 are bolted as at 114 to parallel upper cross heads 115, the opposite ends of which are bored as at 116 to receive the upper ends of motion-transmitting rods 117 which are threaded to receive retaining and adjusting nuts 118. The lower ends of the motion-transmitting rods 117 are threaded into threaded bores 119 in the opposite ends of spaced parallel lower cross heads 120, each cross head 120 having a central horizontally-bored boss 121 in the middle thereof (Figure 4). The bosses 121 receive pivot bolts 122 (Figure 1) which in turn pass through suitably bored spaced ears 123 rising from and integral with the cover plate 98. As a consequence, when pressure fluid is supplied through the pipes 113 to the lower ends of the hydraulic cylinders 110, the plungers 112 rise, lifting the upper cross heads 115, rods 117, lower cross heads 120 and cover plate 98, thereby also raising the upper housing 92 and the movable unit 24 of which it forms a part. The cover plate 98 is, of course, bolted, welded or otherwise suitably secured as at 124 to the top of the upper housing 92 (Figure 2).

Also integral with and rising from the opposite ends of the cover plate 98 are two pairs of spaced ears 125 which are bored to receive pivot bolts 126 (Figures 1 and 3) which also pass through the similarly-bored lower ends of vertical links 127, the upper ends of which are bored to receive pivot bolts 128. The pivot bolts 128 pass through the similarly bored inner ends of inclined equalizer arms 129, the outer ends of which are bored to receive the opposite ends of a rod 130 to which they are keyed as at 131 and retained in position by nuts 132 threaded on the outer ends thereof. The rod 128 passes through the suitably bored outer ends of horizontal arms or brackets 133, the inner ends of which are bolted or otherwise rigidly secured to the opposite end walls 107 of the head 101 (Figure 1). In this manner, the opposite ends of the cover plate 98 and the upper housing 92 connected to it rise and fall evenly at the same rate, and remain constantly parallel to the lower housing 38, so that the upper clamping jaws 90 remain constantly parallel to the lower clamping jaws 89.

The cover plate 98 inwardly of the ears 123 is provided with spaced openings 134 into which are inserted the lower ends of flanged hydraulic cylinders 135 having upwardly opening bores 136 in which single-acting plungers 137 reciprocate. The rounded upper ends of the plungers 137 bear against contact or wear plates 138 secured to the underside of the bottom member 106 of the head 101. The lower ends of the bores 136 are supplied with pressure fluid through a cross pipe 139 (Figure 1) which in turn is connected to a common supply pipe 140 leading to the same conventional hydraulic circuit as the pressure fluid supply pipes 113 by way of suitable control valves (not shown). The hydraulic cylinders 135 and pistons 137 provide additional clamping pressure of any desired amount which it is necessary to exert upon the upper clamping jaws 90 so as to firmly and immovably clamp the work W between them and the lower clamping jaws 89 while flash trimming is being conducted.

*Cutting ram reciprocating mechanism*

The adjacent portions 87 and 91 of the lower and upper housings 38 and 92 are provided respectively with spaced pairs of parallel upper and lower guide bars or bearing rails 150 and 151 respectively of hardened steel (Figures 1, 4 and 5) which are bolted or otherwise rigidly and accurately secured thereto as at 152 and 153 (Figure 1) and accurately positioned by pilot bars 154 and 155 respectively inserted in the suitably grooved portions 91 and 87 and their respective guide rails 150 and 151 (Figure 4). Reciprocably mounted for travel to and fro along the upper and lower guide rails 125 and 151 are upper and lower cutting rams 156 and 157 respectively, the cutting rams 156 and 157 being oppositely grooved in the sides thereof to receive channel-shaped liners 158 and 159 of bearing material such as bronze. The liners 158 and 159 are fixedly secured to the rams 156 and 157 and smoothly and precisely engage the guide rails 150 and 151 to provide for smooth, accurate and rapid reciprocation of the upper and lower rams 156 and 157.

Each of the cutting rams 156 and 157 is provided with longitudinally-spaced parallel vertical bores 160 and 161 respectively for receiving upper and lower cutters 162 and 163 (Figures 1 and 4). These cutters 162 and 163 are arranged in alignment with one another so as to simultaneously cut the flash or excess welded metal away from the seam S between the opposite welded ends of the plates $L_1$ and $L_2$ forming the workpiece W. These cutters 162 and 163 are of any suitable type and may, for example, be of the construction shown in Figures 12 and 13 of the Morton Patent 2,283,507 of May 19, 1942. The lower ram 157 at its opposite ends is provided with inclined-bottomed grooves 164 (Figures 1 and 4) forming downwardly-sloping chip-ejection chutes.

Secured to the upper side of the upper cutting ram 156 are rack bars 166 (Figure 1) having upwardly projecting spaced teeth 167, whereas secured to the lower side of the lower cutting ram 157 are rack bars 168 with downwardly-projecting spaced teeth 169. The teeth 167 and 169 respectively engage pairs of upper and lower endless drive chains 170 and 171. In this manner, any motion of the drive chains 170 or 171 is transmitted to the respective cutting rams 156 and 157 to reciprocate the same. In particular, the teeth 167 and 169 are so spaced as to project in between and engage the rollers 172 and 173 of the upper and lower chains 170 and 171 respectively, these chains being of the usual conventional sprocket chain construction with pivoted inner and outer side links 174 and 175 respectively.

Each of the upper drive chains 170 is supported at its opposite ends (Figure 1) on sprockets 176 and 177, the sprockets 177 being idler sprockets. The sprockets 176 and 177 are rotatably mounted respectively on shafts 178 and 209. The shaft 178 at its opposite ends is supported in the opposite side walls of the upper housing 92. The two sprockets 176 are drive sprockets which are spaced axially apart from one another and keyed or otherwise drivingly secured to a tubular shaft 180 surrounding the shaft 178. The tubular shaft 180 at one end carries a worm wheel 181 keyed or otherwise drivingly connected thereto. Meshing with the worm wheel 181 is a worm 182 mounted on a tubular shaft 183 (Figures 1 and 14) which is journaled at its upper end in a bore 184 in the upper casing 92 and at its lower end in a bearing (not shown) forming a part of an auxiliary housing 185 (Figure 2) secured to the upper housing 92. The upper end of the tubular shaft 183 terminates within an inverted cup-shaped cover 186 which is bolted or otherwise removably secured as at 187 to the top of the upper housing 92.

Keyed or otherwise drivingly secured as at 188 to the upper end of the tubular shaft 183 within the cover 186 is the lower element 189 of a toothed clutch 190, the upper element 191 of which is keyed or otherwise drivingly secured as at 192 to the upper portion of a shaft 193 mounted within and coaxial with the tubular shaft 183. The clutch elements 189 and 191 have interlocking teeth 194 and 195 respectively, and the upper clutch element 191 is axially slidable along the shaft 193 so that its teeth 195 may be selectively engaged with or disengaged from the teeth 194 of the lower clutch element 189 to establish or disestablish a driving connection between the shafts 183 and 193. The upper end of the inner shaft 193 is provided with a threaded reduced diameter portion 196 and above it a squared end portion 197 for receiving a nut 198 and a wrench (not shown) respectively. So long as the nut 198 is threaded down against the upper clutch element 191, the teeth 195 of the latter are engaged with the teeth 194 of the clutch element 189. In order to interrupt the driving connection between them, so as to adjust one shaft relatively to the other shaft, as explained below in connection with the operation, the nut 198 is unthreaded so that, after removing the cover 186, the upper clutch element 191 is lifted off the shaft 193 and out of engagement with the lower clutch element 189, whereupon a wrench applied to the squared portion 197 (Figure 14) rotates the shaft 193 without correspondingly rotating the tubular shaft 183.

Keyed or otherwise drivingly connected to the lower end of the inner shaft 193 is a gear 200 which meshes with and at the same time is slidable along an elongated gear 201 as the upper housing 92 and the movable unit 24 are raised or lowered relatively to the lower housing 38 and stationary unit 23 during the unclamping and clamping movements of the machine 20 respectively. The mechanical connections of the elongated gear 201 are described subsequently below.

At its right-hand end adjacent the drive or driving sprockets 176, each of the upper drive chains 170 is supported by suitably grooved idler rollers 202 and 203 mounted respectively on upper and lower shafts 204 and 205, the opposite ends of which are mounted in and secured to the opposite side walls of the upper housing 92. The upper drive chains 170 at their left-hand ends are provided with a chain-collapsing device or elbow device, generally designated 206, for greatly loosening the chains so as to disengage them from the rack bars 166 of the upper cutting rams 156, enabling easy removal thereof.

The chain collapsing device 206 includes an arm 207, the upper hub 208 of which is pivotally mounted on the shaft 209 which rotatably supports the idler sprockets 177 (Figure 6). The lower hub 210 of the arm 207 is pivotally mounted on a shaft 213 supported thereby. Loosely and rotatably mounted on the shaft 213 are axially-spaced grooved idler rollers 214 (Figures 6 and 7). Pivotally mounted on the opposite end portions of the shaft 213 are resilient arms, generally designated 215. The hub 216 of each arm 215 is bored for the passage of the shaft 213, which at one end is provided with a head 217 and at its opposite end with a threaded portion 218 upon which a retaining nut 219 is threaded.

Each hub 216 is also drilled radially to receive a rod 220 which passes through a bored threaded plug 221 threaded into the lower end of a bore 22 in a hollow arm 223. The rod 220 (Figure 7) passes through the bore 222 and its upper end slidably engages a smaller but coaxial bore 224. Fixedly secured to the rod 220 within the bore 222, or forming an annular enlargement on the rod 220 within the bore 222 is a portion 225 which forms an abutment for the lower end of a compression spring 226, the upper end of which is seated against the end wall of the bore 222 adjacent the bore 224. The upper end of each hollow arm 223 (Figures 6 and 12) is provided with a transverse bore 227 in which is mounted a shaft 228. The shaft 228 is stationary and its opposite end portions are mounted in aligned bores 229 (Figure 6) in spaced parallel slide plates 231 respectively. The shaft 228 is provided at one end with a head 233 whereas its opposite end is threaded as at 234 and receives a retaining nut 235. Also loosely and rotatably mounted upon the shaft 228 is the common hub of two axially-spaced sprockets 236 (Figure 12) which support the left-hand end of the upper course of each of the upper drive chains 170.

The shaft 209 is keyed at each end as at 238 (Figure 6) to a flanged eccentric wheel or disc 239 which is rotatably mounted in a stepped bore 240 in one of the slit plates 231. Spacing sleeves or bushings 241 extend between each of the sprockets 177 and its adjacent eccentric disc 239. Bolted as at 242 to one of the eccentric discs 239 is the hub 243 of a hand crank 244, the outer end of which is bored as at 245 to house a compression spring 246 and plunger 247 connected at one end to a head 248 and carrying at its opposite end a flanged pin 249 adapted to enter and engage any one of a series of holes or sockets 250 (Figure 6) arranged in spaced relationship in an arcuate path concentric with the axis of the eccentric disc 239. Threaded upon the end of the shaft 209 opposite the head 237 thereof is a retaining nut 251.

The slide plates 231 are of approximately rectangular shape with parallel upper and lower edges slidably engaging upper and lower parallel grooves 252 and 253 (Figure 8), the outer walls of which are formed by bars 254 bolted as at 255 to the upper housing 92. Each of the slide plates 231 is provided with an integral inwardly-projecting ear 256 which is bored and threaded as at 257 to receive the inner end of a rod 258, the outer end of which passes through a hole 259 in the upper housing 92 (Figure 7) and is threaded as at 260 to receive an adjusting nut 261. By rotating the nuts 261, the rods 258 and consequently the slide plates 231 are moved to and fro to take up the slack in the upper drive chains 170. Openings 263 are provided in the opposite side walls of the upper housing 92 to permit free movement of the upper slide plates 231.

The upper course of each upper chain 170 is supported by a supporting bar 265 (Figures 1, 4 and 5) carried by a horizontal rib 266 extending inwardly from the inner vertical wall 267 of each side of the upper housing 92, the rib 266 being rabbeted to receive the bar 265. In a similar manner, the lower course of each upper chain 170 bears against a similar bar 268 carried by a similar rib 269 similarly rabbeted. The bars 265 and 268 are bolted or otherwise suitably secured to their respective ribs 266 and 269.

Each of the lower chains 171 is similarly supported or guided along its upper course by a supporting bar 270 carried by a rabbeted rib or flange 271 in the lower housing 38 and the lower course similarly supported by a bar 272 bolted as at 273 to a flanged channel-shaped housing 274, with a spacer 275 in between (Figure 13), the housing 274 depending from and being bolted as at 276 to the undersides or bottoms of the cross members 80 and 81.

The lower course of each lower chain 171 is carried and guided at its opposite ends by idler sprockets 230 rotatably mounted on shafts 281 extending between opposite sides of the lower housing 38. The upper course thereof at its right-hand end is engaged by a drive sprocket 282 and also supported by a grooved roller 283 rotatably mounted on a shaft 284 extending between the opposite side walls of the lower housing 38 (Figure 1). The drive sprocket 282 for each lower chain 171 is mounted on a tubular shaft 285 which in turn is rotatably mounted on a stationary shaft 286 extending between and supported by the opposite side walls of the lower housing 38. The drive sprockets 282 are keyed or otherwise drivingly connected to the tubular shaft 285 which also carries a worm wheel 287 likewise keyed or otherwise drivingly connected thereto. Meshing with the worm wheel 287 in a manner similar to the meshing of the upper worm 182 with the upper worm wheel 181 (Figure 1) is a lower worm 288 which is keyed or otherwise drivingly secured to a vertical shaft 289 to the upper end of which the elongated gear 201 is keyed or otherwise drivingly secured.

The shaft 289 is journaled in the lower housing 38 and at its lower end carries a bevel gear 290 which meshes with a bevel gear 291 mounted on a horizontal shaft 292, the gears 290 and 291 being keyed or otherwise drivingly connected to their respective shafts 289 and 292. The horizontal shaft 292 is connected to suitable conventional automatic reversing mechanism (not shown) to an electric driving motor (also not shown). Such reversing mechanism is well known to those skilled in the machine tool art, it being used, for example, in planers and shapers, and is outside the scope of the present invention.

The left-hand end of each lower chain 171 is supported by a chain collapsing device or elbow device, generally designated 295, similar in construction to the chain collapsing device 206 of the upper chains 170 and similarly operated, but arranged in an inverted position. The chain collapsing device 295 is mounted on two parallel slide plates 296 (Figures 1 and 8) similar to the slide plates 231 carrying the upper chain collapsing device 206 and similarly adjusted for increasing or decreasing the slackness of the chain. Similar parts of the chain collapsing devices 206 and 295 and their respective slide plates 231 and 296 are therefore designated with the same reference numerals. An opening 297 is provided in each of the opposite side walls of the lower housing 38 to permit freedom of motion of the parts carried by the slide plates 296, in a manner similar to the openings 263 provided in the opposite side walls of the upper housing 92 for the same purpose.

Operation

In the operation of the invention, let it be assumed that the flash trimming machine 20 is arranged in the building wherein welding operations are conducted, in a suitable location adjacent the welding machine and aligned with the work W emerging therefrom. The sheet steel strip constituting the work W is threaded through the opening 300 between the upper and lower cutting units 24 and 23 (Figure 1) assuming the upper cutting unit 24 to have been raised a sufficient distance to permit such threading. Such raising of the upper cutting unit 24 is accomplished by supplying pressure fluid through the pipes 113 to the hydraulic cylinders 110 (Figures 1 and 4), moving the plungers 112 upward and carrying with them the upper cross heads 115, rods 117, lower cross heads 120 and upper housing 92 of the upper or movable cutting unit 24, raising the upper clamping jaws 90 away from the lower clamping jaws 89. When the work has been properly inserted in the machine and moved so that the seam S lies approximately underneath the line of action of the cutters 162, pressure fluid is supplied to either the pipe 55 or 56 (Figure 9) to move the cutting assembly 22 back or forth along the base structure 21 until the cutters 162 and 163 are in line with the seam S (Figures 3, 4 and 5).

When this is accomplished, fluid is released from the hydraulic cylinders 110, permitting the plungers 112, cross heads 115 and 120, and housing 92 to descend until the upper jaws 90 engage the work W, the seam S of which is resting in the gap between the lower clamping jaws 89. Extra clamping pressure is now applied by admitting pressure fluid through the pipes 140 and 139 (Figure 1) to the hydraulic cylinders 135, causing the plungers 137 thereof to rise and engage the contact plates 138. The contact plates 138 serve as abutments, so that the effect is to push the upper housing 92 downward and the upper clamping jaws 90 carried thereby into a powerful clamping engagement with the work W.

Power is then applied to the shaft 292 (Figure 1), rotating the upper and lower drive shafts 178 and 286 of the drive sprockets 176 and 282 respectively through the shafts 183 and 193, 289 and the gearing connected with them, causing the upper and lower cutting rams 156 and 157 to reciprocate by their connections at 167, 169 with the upper and lower chains 170, 171, causing the cutters 162, 163 to move along the seam S, cutting off the flash. When the rams 156, 157 have reached the end of their path, the reversing mechanism (not shown) reverses the direction of rotation of the shaft 292, causing the rams 156 and 157 to return to their starting positions. In the meantime, the work W is advanced through the machine to the next seam S from which the flash is to be trimmed.

If the rams 156 and 157 and their cutters 162, 163 are not properly aligned with one another, this alignment may be brought about by moving the lower chain 171 relatively to the upper chain 170 while the latter is held stationary. This may be done by unscrewing the nut 198 (Figure 14), lifting or entirely removing the upper toothed clutch member 191 of the toothed clutch 190 and applying a wrench or hand crank to the squared portion 197 at the upper end of the inner shaft 193. This action rotates the shaft 289 and worm 288 thereon (Figure 1) through the intermediate action of the gears 200, 201, consequently rotating the lower worm wheel 287 and lower drive sprockets 282, so that the lower chain 171 moves, together with the lower ram 157, without correspondingly moving the upper chain 170 and upper ram 156. When the desired alignment of the cutters 162, 163 has been thus achieved, the upper clutch member 191 is replaced, together with its retaining nut 198, thereby restoring the driving connection between the shaft 193 and the tubular shaft 183 constituting the driving connection between the upper and lower worms 182 and 183.

In the event that it is desired to remove the rams 156 or 157 for repair, replacement or sharpening of the cutters 162, 163, either or both of the chain collapsing devices 206 and 295 is operated to collapse one or both of the chains 170 and 171 out of engagement with its associated driving rack 166 or 168, consequently freeing either or both of the cutting rams 156 or 157. This is done by grasping the knob 248 (Figure 6) of the hand crank 244, pulling it axially against the urge of the spring 246 to withdraw the pin 249 from the particular hole 250 in which it is located, then swinging the crank 244 through a half revolution to rotate the eccentric discs 239, thereby causing the angle between the arms 207 and 215 to become more obtuse, and consequently slackening the chain 170 or 171. The latter, thus slackened, can then be moved until its rollers travel free of the ends of the guide bars 269 or 270, causing the rollers of the chain 170 or 171 to move away from their respective driving racks 166 or 168, freeing the ram 156 or 157 so that it may be slid out of the machine for repair or maintenance. After such repair or maintenance, the ram is reinserted and the chain tightened by reversing the foregoing procedure.

To tighten or slacken the chains 170 or 171 for normal driving operations, the operator merely applies a wrench to the nuts 261 on the threaded outer ends 260 of the rods 258, moving the slide plates 231 and 296 in the desired direction along their respective guide grooves 252, thereby tightening or loosening the chains. During normal operation, the springs 226 inside the resilient arms 215 of the chain collapsing devices 206 and 295 (Figures 1 and 7) maintain a yielding engagement with the chain, automatically compensating for any variations in its tautness and at the same time allowing the chain-collapsing device 206 or 295 to collapse sufficiently momentarily to prevent damage in the event that chips or other interference occur between the sprocket or sprocket chain and the driving racks or cutting rams.

What I claim is:

1. In a flash trimming machine, a frame including an elongated base and an elongated head spaced vertically above said base, a horizontally-elongated lower cutting ram support mounted on said base, a horizontally-elongated upper cutting ram support mounted for vertical reciprocation on said frame, upper and lower work clamping members connected respectively to said upper and lower supports, flash cutting rams mounted for parallel horizontal reciprocation on said supports and having cutters thereon projecting toward one another, and hydraulic piston-and-cylinder mechanism mounted on said frame and operatively connected to said upper cutting ram support for vertically reciprocating the same relatively to said lower cutting ram support, said hydraulic mechanism including a plurality of pairs of lifting cylinder elements and lifting piston elements reciprocable therein and a plurality of pairs of clamping cylinder elements and clamping piston elements reciprocable therein, one element of each said pair being connected to said head and the other element thereof being conected to said upper cutting ram support, said hydraulic mechanism including means for applying hydraulic pressure fluid to said cylinder elements to forcibly reciprocate said lifting elements and clamping elements in opposite directions relatively to one another.

2. In a flash trimming machine a frame including an elongated base, a horizontally-elongated lower cutting ram support mounted on and rising from said base for horizontal reciprocation transversely to said base, a horizontally-elongated upper cutting ram support mounted for vertical reciprocation on said lower cutting ram support and rising therefrom, upper and lower work clamping members connected respectively to said upper and lower supports, flash cutting rams mounted for parallel horizontal reciprocation on said supports and having cutters thereon projecting toward one another, and a hydraulim piston-and-cylinder unit mounted on said base at the bottom of said lower cutting ram support and operatively connected to the bottom portion of said lower cutting ram support for reciprocating said lower cutting ram support transversely to said base.

3. In a flash trimming machine, a frame including an elongated base, a horizontally-elongated lower cutting ram support mounted on and rising from said base for horizontal reciprocation transversely to said base, a horizontally-elongated upper cutting ram support mounted for vertical reciprocation on said lower cutting ram support and rising therefrom, upper and lower work clamping members connected respectively to said upper and lower supports, flash cutting rams mounted for parallel horizontal reciprocation on said supports and having cutters thereon projecting toward one another, hydraulic piston-and-cylinder mechanism mounted on said lower cutting ram support and operatively connected to said upper cutting ram support for vertically reciprocating the same relatively to said lower cutting ram support, and a hydraulic piston-and-cylinder unit mounted on said base at the bottom of said lower cutting ram support and operatively connected to the bottom portion of said lower cutting ram support for reciprocating said lower cutting ram support transversely to said base.

References Cited in the file of this patent
UNITED STATES PATENTS

| | | |
|---|---|---|
| 1,854,522 | Morton | Apr. 19, 1932 |
| 1,958,146 | Kelley | May 8, 1934 |
| 2,120,316 | Stone | June 14, 1938 |
| 2,196,479 | Sloan | Apr. 9, 1940 |
| 2,283,507 | Morton | May 19, 1942 |
| 2,314,656 | Morton | Mar. 23, 1943 |
| 2,580,817 | Morton | Jan. 1, 1952 |